United States Patent [19]

Mikame et al.

[11] Patent Number: 5,724,929
[45] Date of Patent: Mar. 10, 1998

[54] ENGINE VARIABLE VALVE TIMING MECHANISM

[75] Inventors: Kazuhisa Mikame, Nagoya; Ken Asakura; Tatsuo Iida, both of Toyota, all of Japan

[73] Assignee: Toyota Jidosha Kabushiki Kaisha, Toyota, Japan

[21] Appl. No.: 835,252

[22] Filed: Apr. 7, 1997

[30] Foreign Application Priority Data

Apr. 9, 1996 [JP] Japan ............................ 8-086481
Mar. 18, 1997 [JP] Japan ............................ 9-064123

[51] Int. Cl.[6] .............................................. F01L 1/344
[52] U.S. Cl. ............................... 123/90.17; 123/90.31
[58] Field of Search ........................... 123/90.15, 90.17, 123/90.31, 90.33, 90.34; 74/567, 568 R; 464/1, 2, 160

[56] References Cited

U.S. PATENT DOCUMENTS 4,858,572  8/1989  Shirai et al. ................. 123/90.15
5,107,804  4/1992  Becker et al. ................ 123/90.17

FOREIGN PATENT DOCUMENTS 1085087  1/1955  France .
1-92504A  4/1989  Japan .
5106412A  4/1993  Japan .
5-113112A  5/1993  Japan .

OTHER PUBLICATIONS

Patent Abstracts of Japan, vol. 017, No. 479 (M–1471), Aug. 31, 1993 & JP 05 11312 A (Toyo A Tec KK), May 7, 1993.

*Primary Examiner*—Weilun Lo
*Attorney, Agent, or Firm*—Kenyon & Kenyon

[57] ABSTRACT

A variable valve timing mechanism is provided at the distal end of a camshaft for changing a valve timing of an engine valve. A rotor is fixed to the distal end face of the camshaft, and the rotor has four vanes protruding radially outward. A housing is disposed to surround the rotor to be rotatable relative to the rotor and the camshaft, and the housing has recesses on the inner circumference. Each recess is divided by the vane into a first pressure chamber and a second pressure chamber. A first passage is defined in the camshaft, for supplying a hydraulic fluid pressure to the first pressure chamber so as to change the rotational phase of the second rotor with respect to the camshaft, and the first passage has an opening at the distal end face of the camshaft. A second passage is defined in the camshaft, for supplying a fluid pressure to the second pressure chamber so as to change the rotational phase of the second rotor with respect to the camshaft, and the second passage has an opening at outer circumference of the camshaft.

20 Claims, 10 Drawing Sheets

ENGINE VARIABLE VALVE TIMING MECHANISM

BACKGROUND OF THE INVENTION

The present invention relates to a variable valve timing mechanism provided in an engine to change the valve timing of intake valves or exhaust valves. More particularly, the present invention pertains to a variable valve timing mechanism that is driven by fluid pressure.

A variable valve timing mechanism (hereafter referred to as VVT) is provided in an engine to displace the rotational phase of a camshaft and adjust the valve timing of either an intake valve or an exhaust valve. The operation of the VVT optimizes the valve timing in accordance with the operating state of the engine (engine load, engine speed, and other factors). This improves fuel economy, increases engine power, and suppresses undesirable engine emissions regardless of different operating states of the engine.

U.S. Pat. No. 5,483,930, which is incorporated herein by reference, discloses this a type of variable valve timing mechanism (hereinafter referred to as VVT) for an internal combustion engine. This VVT is of the helical gear type. In this VVT, the rotational phase of a camshaft with respect to a pulley is changed by moving a ring gear including a helical spline so as to adjust the valve timing of valves driven by the camshaft.

Meanwhile, Japanese Unexamined Patent Publication No. Hei 5-113112 discloses an example of vane type VVT. In this vane type VVT, a rotor is rotated relative to a pulley. Oil pressure is used to change the rotational phase of the camshaft with respect to the pulley, and thus the valve timing of valves driven by the camshaft is adjusted. This vane type VVT permit the axial length of the camshaft to be reduced as compared with an engine using a helical gear type VVT.

Figure 12:
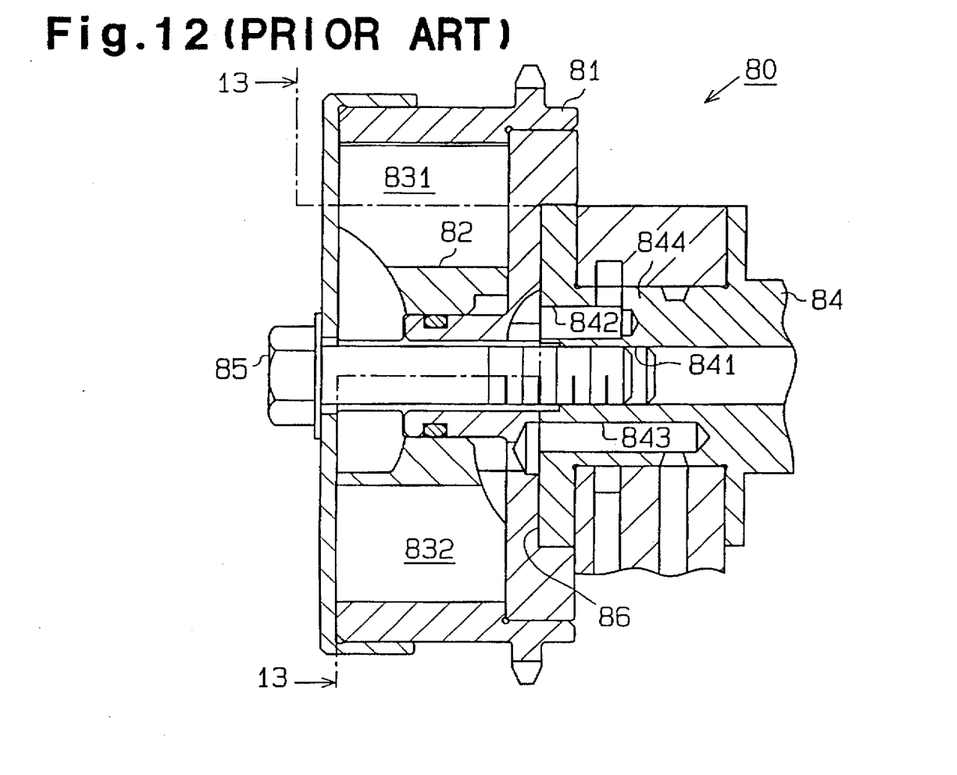
FIG. 12 shows a cross-sectional view of the prior art VVT.
Figure 13:
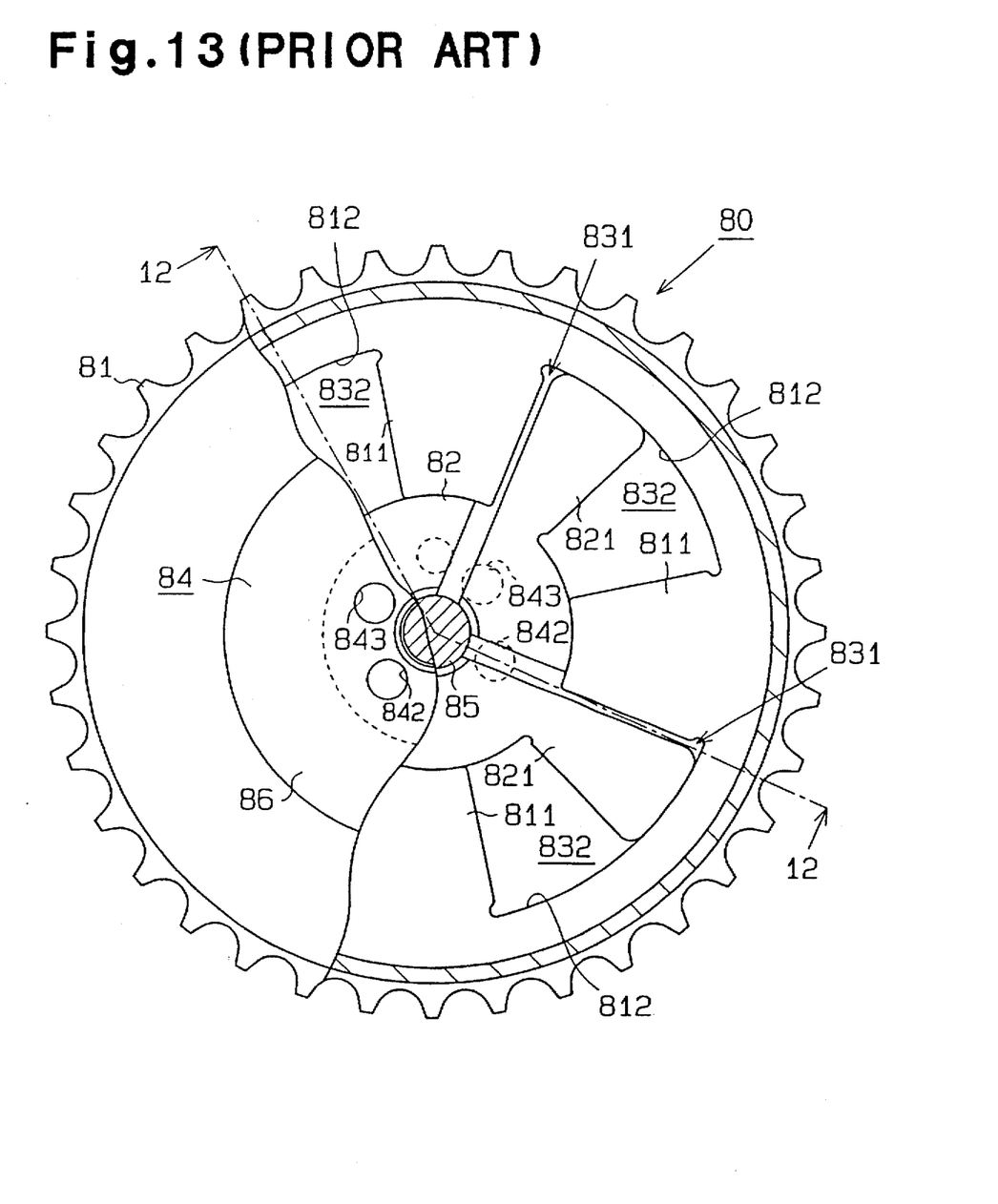
FIG. 13 shows a cross-sectional view taken along the line 13—13 of FIG. 12.

Generally, vane type VVTs have a structure as shown in FIGS. 12 and 13. As shown in FIG. 12, the VVT 80 is attached to the distal end of a camshaft 84. The camshaft 84 has a bolt hole 841 defined on the distal end, and a rotor 82 is fixed to that end by a bolt 85. A sprocket 81 surrounds the rotor 82 such that it can rotate relative to the rotor 82 and the camshaft 84. The sprocket 81 is connected to a crankshaft (not shown) by a chain (not shown).

As shown in FIG. 13, the sprocket 81 has a plurality of inward protrusions 811, and every adjacent two protrusions 811 define a recess 812. The rotor 82 has a plurality of vanes 821, and each vane 821 is housed in one of the recesses 812. Each vane 821 defines on each side a first hydraulic chamber 831 and a second hydraulic chamber 832 in the corresponding recess 812.

When oil pressure is supplied through oil passages 842 defined through the camshaft 84 into the first hydraulic chambers 831, the rotor 82 is rotated clockwise relative to the sprocket 81. When oil pressure is supplied through oil passages 843 defined through the camshaft 84 into the second hydraulic chambers 832, the rotor 82 is rotated counterclockwise relative to the sprocket 81. With the relative rotation of the rotor 82, the rotational phase of the camshaft 84 with respect to the sprocket 81 (crankshaft) is changed, and thus the valve timing of valves (not shown) to be driven by the camshaft 84 is adjusted.

During operation of the VVT 80, the camshaft 84 receives a torque from the VVT 80 at its distal end. However, since the camshaft 84 contains many hollow spaces including the oil passages 842, 843 and the bolt hole 841, the camshaft 84 tends to have insufficient rigidity against the torque. Particularly, since the camshaft 84 has a smaller diameter at the journal 844 than at other portions, the rigidity of the journal 844 is lower than that of the other portions.

The oil passages 842, 843 open on the same plane, i.e., on the end face 86 of the camshaft 84, and the openings of these oil passages 842, 843 are close to one another. Accordingly, it is difficult to seal between the oil passage 842 and the oil passage 843, and the oil supplied to the oil passages 842 can leak into the oil passages 843 or, the oil supplied to the oil passages 843 can leak to the oil passages 842. If leakage occurs, the desired oil pressure values are not attained in the hydraulic chambers 831, 832, which deteriorates the response of the VVT 80.

SUMMARY OF THE INVENTION

The present invention was accomplished in view of such circumstances described above, and it is an objective of the invention to provide a variable valve timing mechanism, which is driven by hydraulic fluid pressure, more specifically, a variable valve timing mechanism for an engine, which employs a camshaft having improved rigidity and which can reduce leakage of hydraulic fluid supplied to the respective pressure chambers.

To achieve the above objective, apparatus includes a camshaft for driving the cam, the camshaft having a circumferential surface and a first end, wherein the first end has an end face, a first rotor fixed to the end face of the camshaft, the first rotor having radially extending vanes, a second rotor arranged to surround the first rotor and to be rotatable relative to the first rotor, the second rotor having a recess formed therein, the recess being divided by the vane into a first pressure chamber and a second pressure chamber, a first passage defined in the camshaft, for supplying hydraulic fluid to the first pressure chamber to change the rotational phase of the second rotor with respect to the camshaft, the first passage having an upstream end and a downstream end with respect to the direction of fluid flow during filling of the first hydraulic chamber, the first passage having a downstream opening in the end face, and a second passage defined in the camshaft for supplying hydraulic fluid to the second pressure chamber to change the rotational phase of the second rotor with respect to the camshaft, the second passage having an upstream end and a downstream end with respect to the direction of fluid flow during filling of the second hydraulic chamber, the second passage having a downstream opening in a surface of the cam other than the end face.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS (First Embodiment)

The variable valve timing mechanism (hereinafter referred to as VVT) according to a first embodiment of the present invention will be described below referring to FIGS. 1 to 3.

Figure 1:
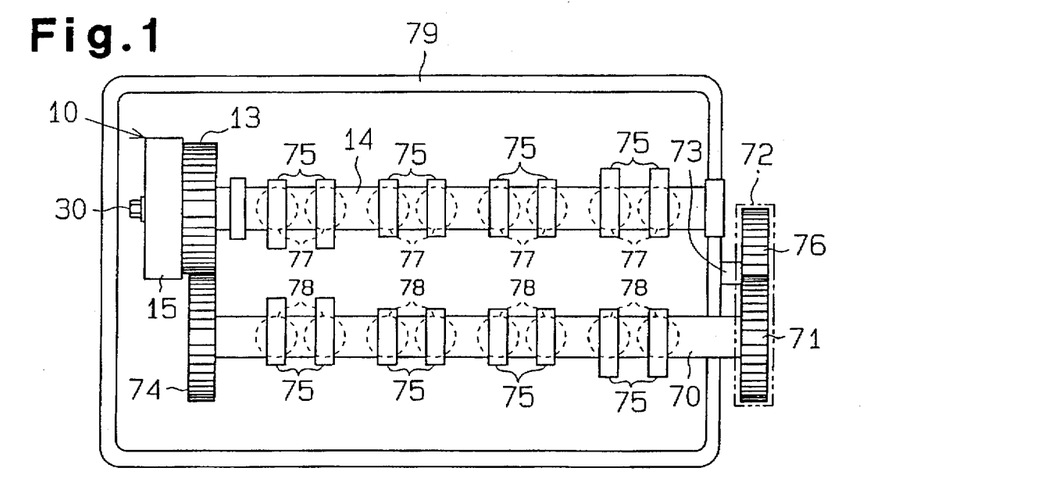
FIG. 1 shows a diagrammatic plan view of a valve train including the variable timing mechanism (VVT) according to the present invention.

As shown in FIG. 1, an intake side camshaft 14 and a exhaust side camshaft 70 are supported rotatably on a cylinder head 79. The terms "left" and "right" are used herein to refer to the leftward and rightward direction of FIG. 1. Similarly, the terms "clockwise" and "counterclockwise" refer to the perspective of FIG. 2.

The camshafts 14,70 each have a plurality of cams 75. An intake valve 77 is located under each cam 75 of the camshaft 14, whereas an exhaust valve 78 is located under each cam 75 of the camshaft 70. A VVT 10 is attached to the end of the intake side camshaft 14. A drive gear 74, which is attached to the left end of the exhaust camshaft 70 is meshed with a driven gear 13 attached to the distal end portion of the intake side camshaft 14. A pulley 71 is attached to the right end of the exhaust camshaft 70 and is connected to a pulley 76 of a crankshaft 73 via a timing belt 72.

When the crankshaft 73 is rotated, the exhaust camshaft 70 is rotated via the pulleys 76,71 and the belt 72. The torque of the exhaust camshaft 70 is transmitted to the intake camshaft 14 via the gears 74, 13 to rotate the camshaft 14. Thus, the intake valves 77 and the exhaust valves 78 are opened and closed under predetermined valve timings by the rotation of these camshafts 14 and 70.

Figure 3:
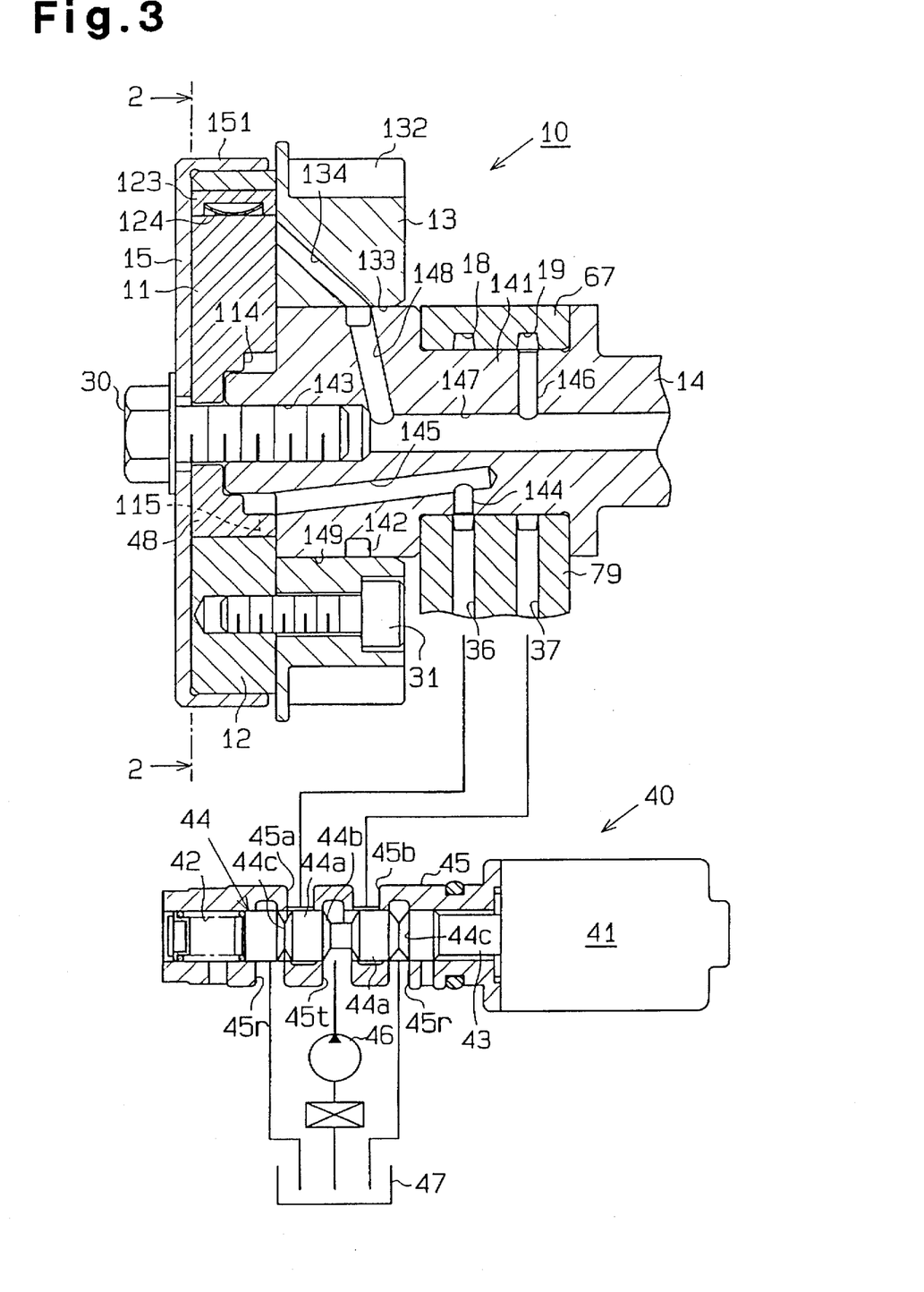
FIG. 3 shows a cross-sectional view taken along the line 3—3 of FIG. 2.

As shown in FIG. 3, the VVT 10 contains the camshaft 14, a rotor 11 fixed to the left end of the camshaft 14, a housing 12 surrounding the rotor 11, the driven gear 13 fixed to the housing 12 and a cover 15 covering the housing 12.

The camshaft 14 has a journal 141, and the camshaft 14 is supported at the journal 141 by the cylinder head 79 and a bearing cap 67. The camshaft 14 has a bolt hole 143 at the left end. The rotor 11 and the cover 15 are fixed to the left end of the camshaft 14 by a bolt 30 and are rotated integrally with the camshaft 14. The housing 12 surrounds the rotor 11 and is rotatable relative to the camshaft 14 and the rotor 11. The cover 15 has a flange 151 covering the housing 12.

The driven gear 13 is fixed to one side of the housing 12 by bolts 31 to be rotatable relative to the camshaft 14 and the rotor 11. The driven gear 13 has a thick ring-like shape and has a plurality of teeth 132 formed on the circumference. The driven gear 13 is rotatably supported on outer surface 149 of the camshaft 14.

Figure 2:
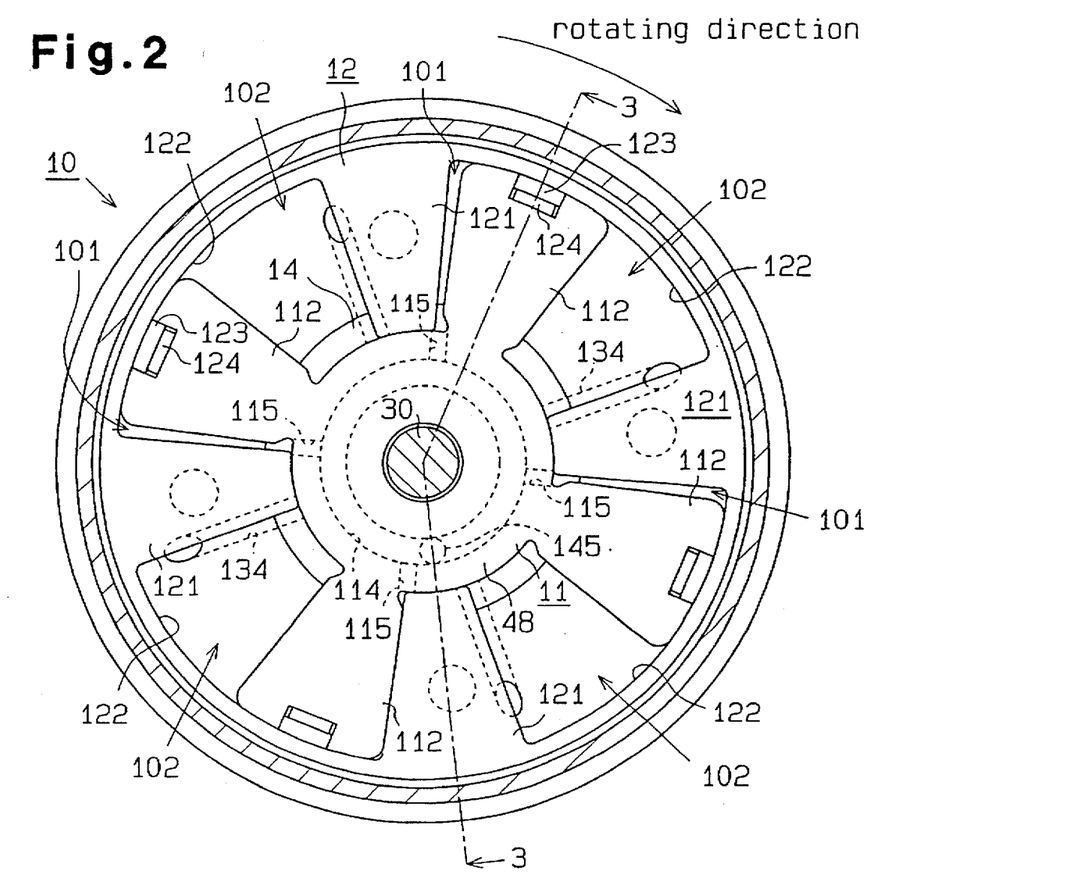
FIG. 2 shows a cross-sectional view of the VVT according to a first embodiment of the present invention.

As shown in FIG. 2, the housing 12 and the rotor 11 are rotated clockwise. The housing 12 and that of the rotor 11 shown in FIG. 2 are in their initial positions where the valve timing of the intake valves 77 (shown in FIG. 1) is delayed most. The housing 12 has four inward protrusions 121, and every adjacent two protrusions 121 define a recess 122. The driven gear 13 is fixed by the bolts 31 to the protrusions 121 of the housing 12.

The rotor 11 consists of a boss 48 and four vanes 112 protruding therefrom radially outward. The outer circumference of the boss 48 is brought into contact with the end faces of the protrusions 121. These four vanes 112 are arranged at approximately 90 degree intervals, and the vanes 112 are housed in the recesses 112 of the housing 12 respectively. Each vane 112 defines, in the corresponding recess 122, a first hydraulic chamber 101 and a second hydraulic chamber 102. The first hydraulic chamber 101 is located on the trailing side with respect to the rotating direction of the vane 112, while the second hydraulic chamber 102 is located on the leading side. Oil pressure is supplied to the hydraulic chambers 101, 102 respectively so as to effect relative rotation of the rotor 11 with respect to the housing 12. A seal 123 and a leaf spring 124 for urging the seal 123 toward the inner circumference of the housing 12 are attached to the distal end of each vane 112. The seal 123 and the leaf spring 124 seal between the first hydraulic chamber 101 and the second hydraulic chamber 102.

Next, a structure for supplying oil pressure to the first and second hydraulic chambers 101, 102 will be described.

As shown in FIG. 3, two oil passages 145, 147 are defined in the camshaft 14 in the axial direction. Meanwhile, two oil passages 36, 37 are defined in the cylinder head 79. Ring-like oil grooves 18, 19 are formed on the inner surfaces of the cylinder head 79 and the bearing cap 67. An oil hole 144, which is defined in the camshaft 14, connects the oil passage 145 and the oil groove 36; while another oil hole 146, which is also defined in the camshaft 14, connects the oil passage 147 and the oil groove 19. An annular chamber 114 is defined around the left end portion of the camshaft 14. The boss 48 of the rotor 11 has four passages 115 defined radially therein, and each passage 115 secures communication between the annular chamber 114 and the first hydraulic chambers 101 (FIG. 2). The camshaft 14 has a ring-like oil groove 142 formed on its outer surface 149. Another oil hole 148, which is also defined in the camshaft 14, connects the oil passage 147 and the oil groove 142. The driven gear 13 contains four passages 134 defined radially therein, and these passages 134 connects the oil groove 142 and the second hydraulic chambers 102 (FIG. 2). Oil is supplied to the first hydraulic chambers 101 through the oil passage 36, the oil groove 18, the oil hole 144, the oil passage 145, the annular chamber 114 and the passages 115. Meanwhile, oil is supplied to the second hydraulic chambers 102 through the oil passage 37, the oil groove 19, the oil hole 146, the oil passage 147, the oil hole 148, the oil groove 142 and the passages 134.

As described above, while the camshaft 14 has some hollow spaces therein, only the oil passage 145 and the bolt hole 143 open to the left end face of the camshaft 14, and the oil groove 142 opens to the outer surface 149 of the camshaft 14.

A small clearance for permitting relative rotation between the camshaft 14 and the driven gear 13 is defined between the outer surface 149 of the camshaft 14 and the inner surface 133 of the driven gear 13.

Next, actions of an oil control valve (hereinafter referred to as an OCV) 40 for supplying oil pressure to the first and second hydraulic chambers 101, 102 and of the VVT 10 will be described.

As shown in FIG. 3, the OCV 40 has a plurality of ports 45a, 45b, 45r, 45t to switch the direction of supplying and discharging the oil and to adjust the oil pressure supplied from the first port 45a and the second port 45b to the hydraulic chambers 101 and 102, respectively. The OCV 40 is provided with a solenoid actuator 41, a casing 45, a spool 44 disposed in the casing 45, a plunger 43 connected to the spool 44 and a coil spring 42 for urging the spool 44. The spool 44 is reciprocated in the axial direction by performing duty control of the actuator 41. This reciprocating motion of the spool 44 achieves adjustment of the amount of oil to be supplied.

The supply port 45t is connected via a hydraulic pump 46 to an oil pan 47; while the first and the second ports 45a and 45b are connected to the oil passages 36 and 37 respectively. The drain port 45r is connected to the oil pan 47. The spool 44 is cylindrical valve body and has lands 44a, which interrupt the flow of the oil and passages 44b, 44c, which permit flow of the oil.

The oil drawn or discharged by the pump 46 under the operation of the OCV 40 is supplied through the supply port 45t and the first port 45a to the oil passage 36 or through the supply port 45t and the second port 45b to the oil passage 37. When the oil is introduced through the first port 45a, the oil is supplied to the first hydraulic chambers 101 to increase the oil pressure in each hydraulic chamber 101. Simultaneously, the oil in each second hydraulic chamber 102 is discharged through the oil passage 37 to the second port 45b to reduce the oil pressure in the second hydraulic chamber 102. Likewise, when the oil is introduced through the second port 45b, the oil pressure in each second hydraulic chamber 102 is increased. Simultaneously, the oil in each first hydraulic chamber 101 is discharged through the oil passage 36 to the first port 45a to reduce the oil pressure in the first hydraulic chamber 101. Introduction of the oil through the ports 45a, 45b or discharge of the oil through these ports 45a, 45b is interrupted by blocking them.

As described above, when oil pressure is supplied to the first hydraulic chamber 101, torque is applied to the rotor 11 and the camshaft 14 causing the rotor 11 to move to the initial position as shown in FIG. 2. That is, the rotor 11 and the camshaft 14 are rotated clockwise relative to the driven gear 13. Thus, the rotational phase of the camshaft 14 with respect to the driven gear 13 and the crankshaft 73 (FIG. 1) is changed, and the valve timing of the intake valves 77 (FIG. 1), which are driven by the camshaft 14, is advanced. The relative rotation of the rotor 11 is restricted by the protrusions 121. The valve timing of the intake valves 77 reaches the most advanced state. When the vanes reach the clockwise limit and at least one vane 112 about a protrusion 121.

When oil pressure is supplied to the second hydraulic chambers 102, torque is applied to the rotor 11 and the camshaft 14 to rotate them counterclockwise relative to the driven gear 13. Thus, the rotational phase of the camshaft 14 with respect to the driven gear 13 and the crankshaft 73 (FIG. 1) is changed, and the valve timing of the intake valves 77 (FIG. 1), which are driven by the camshaft 14, is delayed. When the rotor 11 is rotated to the initial position shown in FIG. 2, the valve timing of the intake valves 77 is the most delayed.

The oil supplied to the oil groove 142 of the camshaft 14 is fed to the small clearance between the outer surface 149 of the camshaft 14 and the inner surface 133 of the driven gear 13 to facilitate smooth relative rotation of the camshaft 14 relative to the driven gear 13.

The valve timing of the intake valves 77 can be changed to the most delayed angle phase or to the most advanced angle phase by performing binary adjustment of the oil pressure values in the hydraulic chambers 101, 102 respectively under control of the OCV 40. Otherwise, the valve timing of the intake valves 77 may be changed continuously between the most delayed angle phase and the most advanced angle phase by continuously adjusting the oil pressure values in the hydraulic chambers 101, 102.

As detailed above, according to the illustrated, only the oil passage 145 and the bolt hole 143 open to the left end face of the camshaft 14, and the oil groove 142 opens to the surface 149 of the camshaft 14. Unlike the prior art camshaft, in which all of the oil passages communicating with the first and second hydraulic chambers and the bolt hole open to the left end face of the camshaft, the camshaft 14 of the first embodiment has less hollow space formed at the left end, so that the rigidity of the camshaft 14 is improved.

The distance between the passage 115 opening to each first hydraulic chamber 101 and the passage 134 opening to each second hydraulic chamber 102 is increased compared with that of the prior art VVT. Accordingly, leakage of oil from the passages 134 to the first hydraulic chambers 101 or from the passages 115 to the second hydraulic chambers 102 is reduced, which reduces oil pressure interference between the hydraulic chambers 101 and 102. Thus, a desired oil pressure can be supplied to the hydraulic chambers 101 and 102, and the responsiveness of the VVT 10 is improved.

(Second Embodiment)

Figure 4:
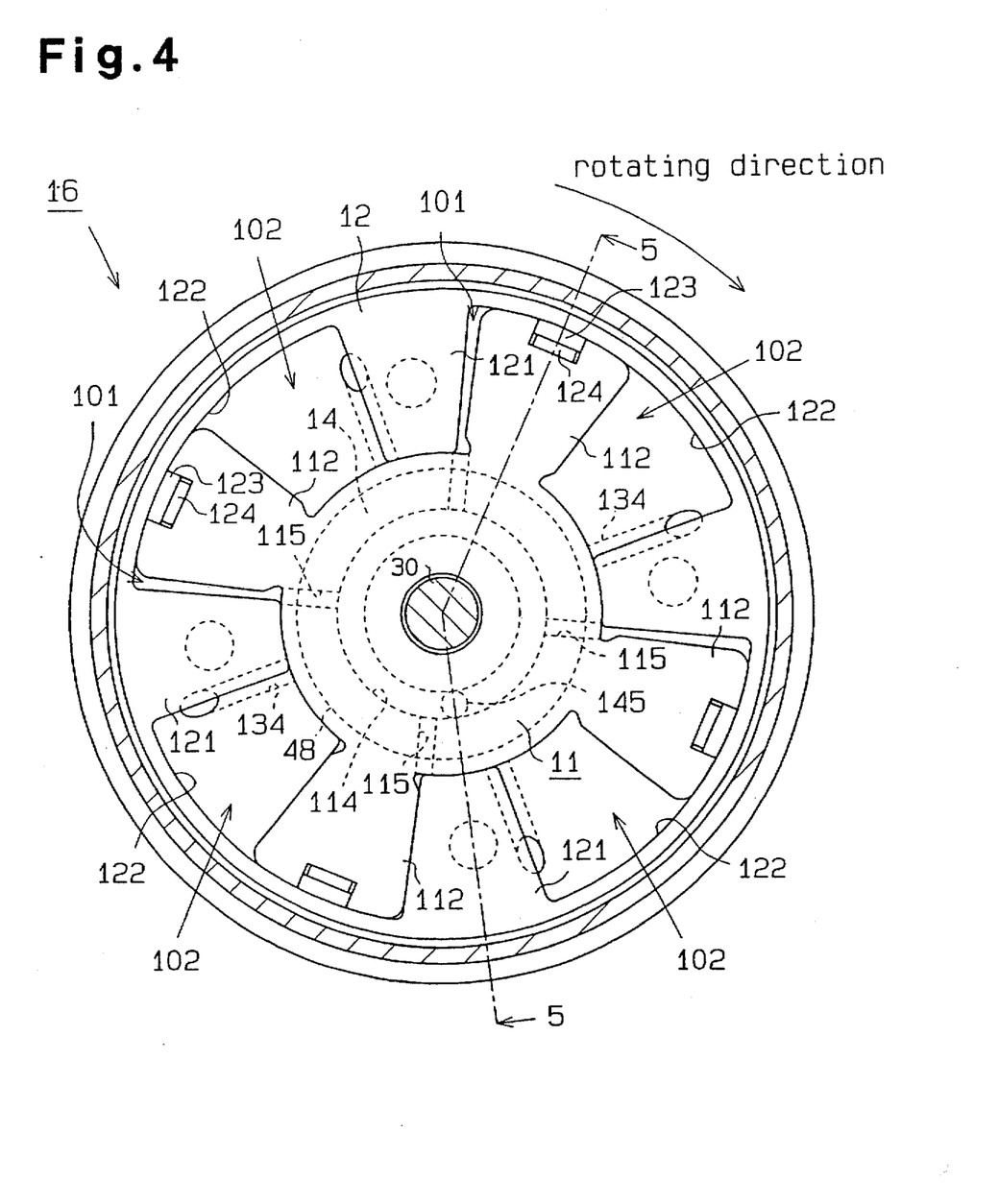
FIG. 4 shows a cross-sectional view of the VVT according to a second embodiment of the present invention.

Next, the VVT according to a second embodiment of the present invention will be described referring to FIGS. 4 and 5. Parts of this embodiment are given the same or similar reference characters to corresponding parts of the first embodiment, and only differences from the first embodiment will be described. In this embodiment, the outside diameter at the lest end portion of the camshaft 14 and the outside diameter of the boss 48 of the rotor 11 are different from those in the first embodiment.

Figure 5:
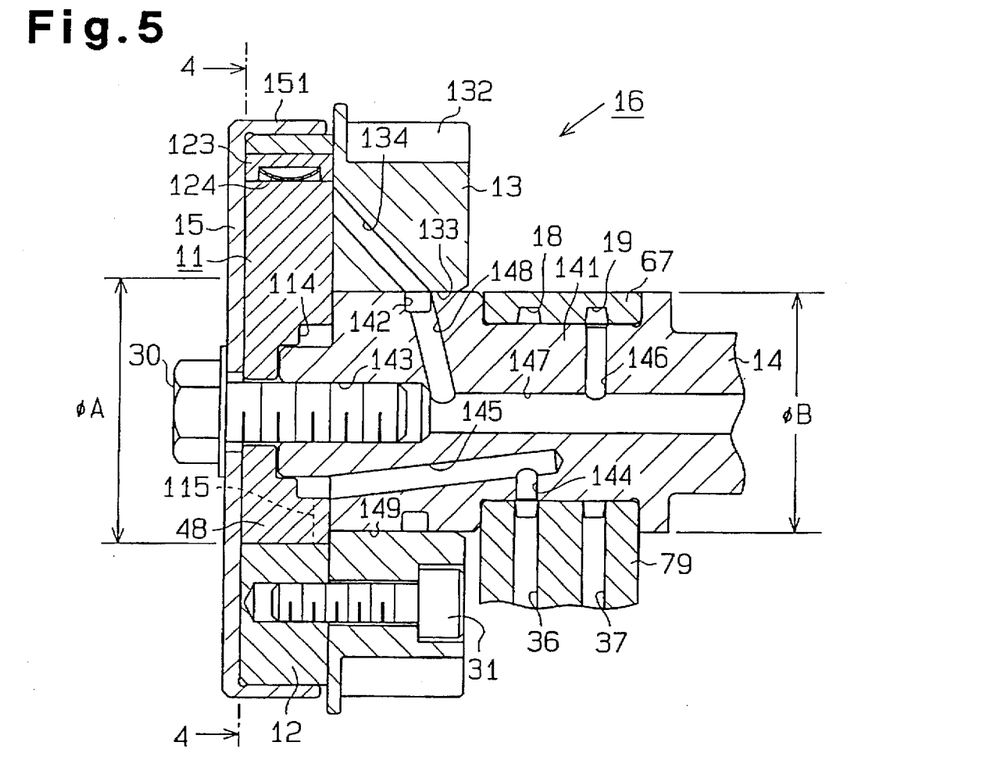
FIG. 5 shows a cross-sectional view taken along the line 5—5 of FIG. 4.

As shown in FIG. 5, the outside diameter φB at the distal end portion of a camshaft 14 is designed to be smaller than the outside diameter φA of the boss 48 of the rotor 11. Thus, at the distal end face of the camshaft 14, the boundary between the outer circumference 149 of the camshaft 14 and the inner circumference 133 of the driven gear 13 is sealed by one side of the boss 48. Accordingly, that boundary is not exposed to the first and the second hydraulic chambers 101, 102 (FIG. 4).

In the second embodiment, again, a small clearance permitting relative rotation between the camshaft 14 and the driven gear 13 is defined between the outer surface 149 of the camshaft 14 and the inner surface 133 of the driven gear 13. Smooth rotation of the camshaft 14 relative to the driven gear 13 is achieved by the oil supplied to the clearance.

In the second embodiment, since the clearance is sealed at the left end face of the camshaft 14, leakage of the oil from the clearance is avoided. Accordingly, the desired oil pressure is supplied to the chambers 101 and 102 respectively, and the responsiveness and operability of the VVT 16 is improved.

(Third Embodiment)

The VVT according to a third embodiment of the present invention will be described below referring to FIGS. 6 to 8.

Figure 6:
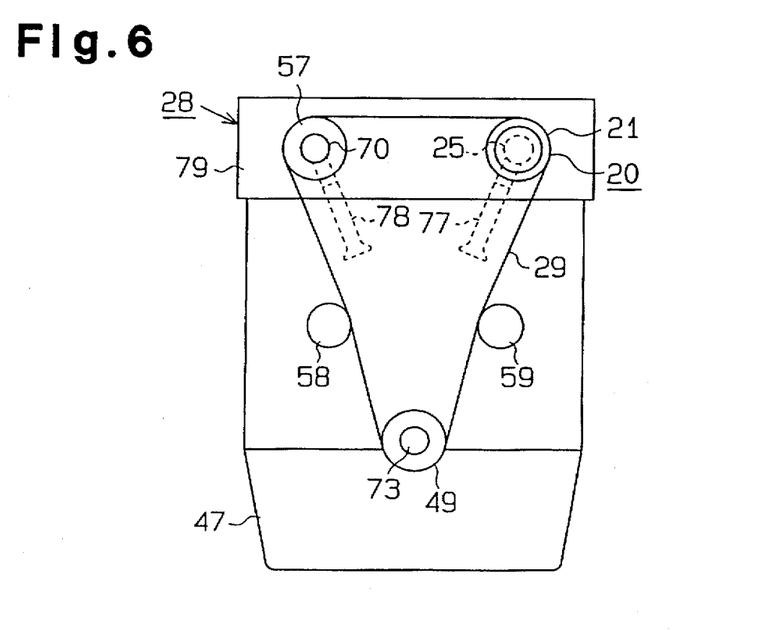
FIG. 6 shows a diagrammatic front view of an engine containing the VVT according to a third embodiment of the present invention.

As shown in FIG. 6, an intake side camshaft 25, the exhaust camshaft 70 and the crankshaft 73 are connected by a chain 29 to which a predetermined tension is applied by idlers 58, 59. The VVT 20 according to the third embodiment is attached to the left end of the intake side camshaft 25. When the crankshaft 73 is rotated, the camshafts 25, 70 are rotated synchronously with the crankshaft 73 via the chain 29 and the sprockets 49, 21, 57, and the intake valves 77 and the exhaust valves 78 are driven under predetermined valve timings, respectively.

Figure 7:
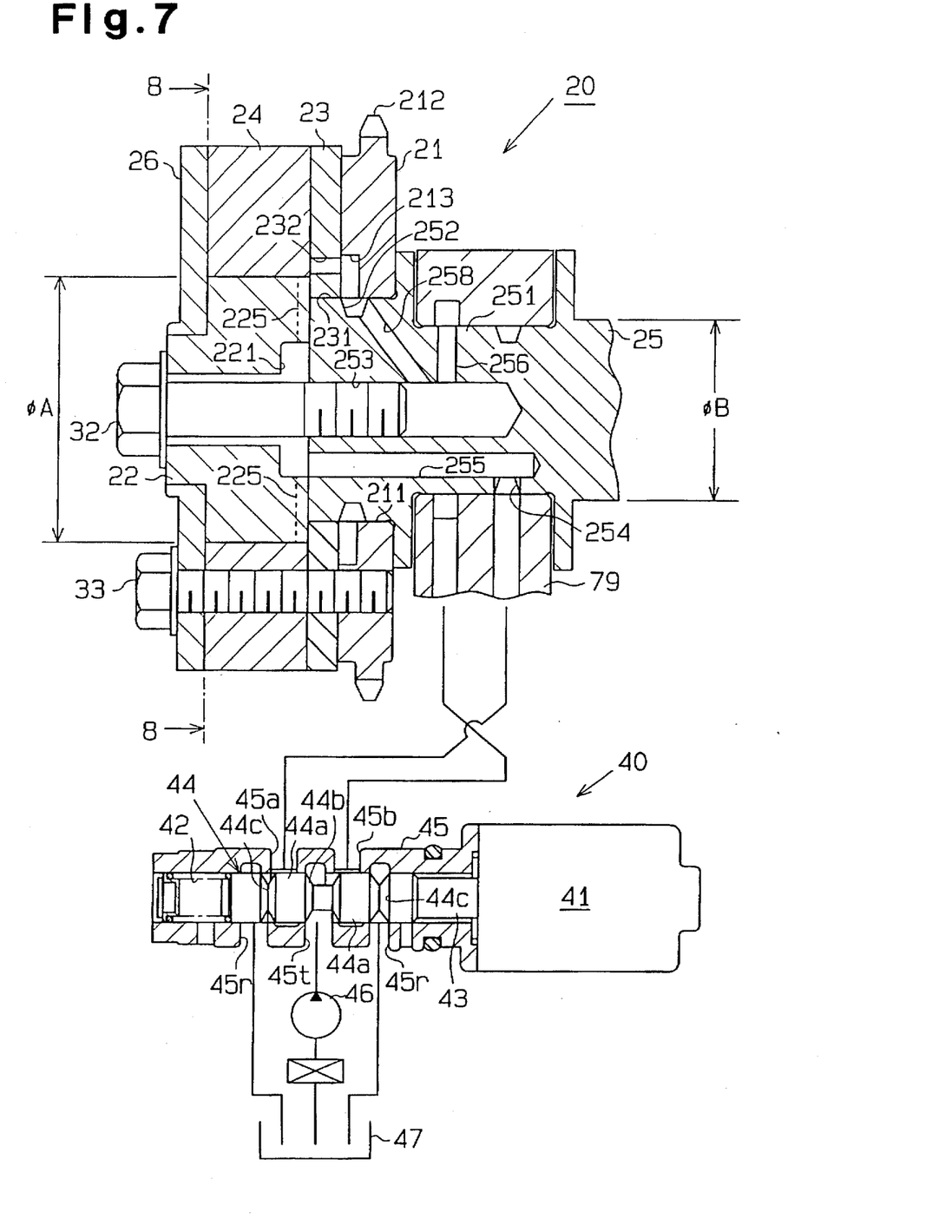
FIG. 7 shows a cross-sectional view of the VVT shown in FIG. 6 taken along the line 7—7 of FIG. 8.

As shown in FIG. 7, the VVT 20 includes a rotor 22, a housing 24 surrounding the rotor 22, a sprocket 21 fixed to the housing 24 via a plate 23, and a cover 26 covering the housing 24.

The camshaft 25 supported on the cylinder head 79 has a bolt hole 253 defined on the left end. The rotor 22 is fixed to that end of the camshaft 25 by a bolt 32 so that it is rotated integrally with the camshaft 25. The housing 24 surrounding the rotor 22 is rotatable relative to the camshaft 25 and the rotor 22. The cover 26, the plate 23 and the sprocket 21 are fixed by bolts 33 to the housing 24 so that they are rotated integrally.

Figure 8:
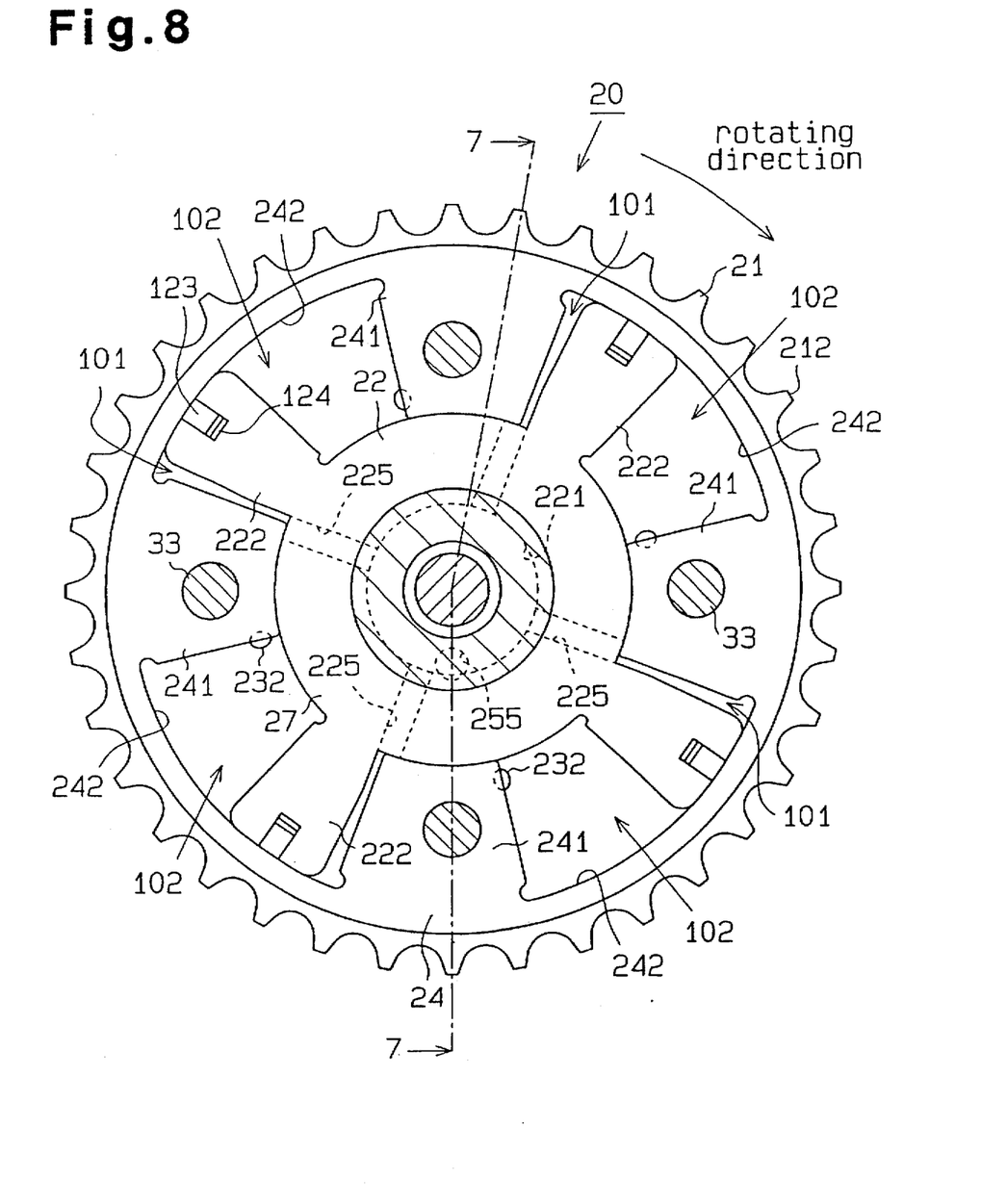
FIG. 8 shows a cross-sectional view taken along the line 8—8 of FIG. 7.

As shown in FIG. 8, the rotor 22 has a boss 27 and four vanes 222, each of which defines a first hydraulic chamber 101 and a second hydraulic chamber 102 in a corresponding recess 242 of the housing 24. An annular chamber 221 is defined between the left end portion of the camshaft 25 and the rotor 22. The boss 27 of the rotor 22 has four passages 225 defined radially therein, and these passages 225 connect between the annular chamber 221 and the first hydraulic chambers 101.

As shown in FIG. 7, the diameter φA of the boss 27 of the rotor 22 is designed to be greater than the diameter φB at the left end portion of the camshaft 25. Thus, at the left end face of the camshaft 25, the boundary between the outer circumference 231 of the camshaft 25 and the inner circumference 211 of the plate 23 is sealed by the boss 27.

The camshaft 25 contains an oil passage 255 defined axially therein, and the oil passage 255 opens at the left end to the annular chamber 221 and at the right to the oil hole 254.

One side of the plate 23, which constitutes the wall surface of the first and second hydraulic chambers 101, 102, contains four oil holes 232, which communicate with to the second hydraulic chambers 102, respectively. An annular chamber 213 is defined between the sprocket 21 and the plate 23 to connect an oil groove 252 formed on the outer circumference of the camshaft 25 with the oil holes 232. The camshaft 25 contains an oil passage 258 extending diagonally to connect the oil groove 252 and the bolt hole 253. The camshaft 25 has a radial oil passage 256 defined at the journal 251 thereof so as to communicate with the bolt hole 253.

When oil is supplied from the OCV 40 through the oil hole 254, the oil passage 255, the annular chamber 221, and the passages 225 to the first hydraulic chambers 101, the rotor 22 and the camshaft 25 are rotated clockwise relative to the housing 24. Thus, the valve timing of the intake valves 77 (FIG. 6) is advanced. When oil is supplied from the OCV 40 through the oil passage 256, the bolt hole 253, the oil passage 258, the oil groove 252, the annular chamber 213 and the oil holes 232 to the second hydraulic chambers 102, the rotor 22 and the camshaft 25 are rotated counterclockwise relative to the housing 24. Thus, the valve timing of the intake valves 77 is delayed.

In the third embodiment, again, the clearance between the outer surface 231 of the camshaft 25 and the inner surface of the plate 23 is sealed by the boss 27 at the left end face of the camshaft 25, so that leakage of the oil from the clearance is substantially avoided. Accordingly, the desired oil pressure is supplied to the chambers 101 and 102 respectively, and the responsiveness and operability of the VVT 20 is improved.

In the third embodiment, the distance between the passage 225 opening to the first hydraulic chamber 101 and the oil hole 232 opening to the second hydraulic chamber 102 is increased compared with that in the prior art VVT. Accordingly, oil leakage between the passage 225 and the oil hole 232 is substantially reduced, which results in more accurate operation of the VVT 20.

In this embodiment, since the plate 23 constitutes one side wall in each of the pressure chambers 101, 102, the diameter of the housing 24 can be increased by increasing the diameter of the plate 23 without increasing the diameter of the sprocket 21. As described above, by increasing the diameter of the housing 24 and the radial length of each vane 222, the force to be applied to each vane 22 can be increased. Accordingly, the driving force of the VVT 20 is increased while vibration of the rotor 22 attributed to fluctuation in the torque of the camshaft 25 is reduced. Thus, the responsiveness of the VVT 20 is improved.

(Fourth Embodiment)

The VVT according to a fourth embodiment of the present invention will be described below referring to FIGS. 9 and 10. Differences from the third embodiment will primarily be described. The VVT of the fourth embodiment is applied to the same valve train as shown in FIG. 6.

Figure 9:
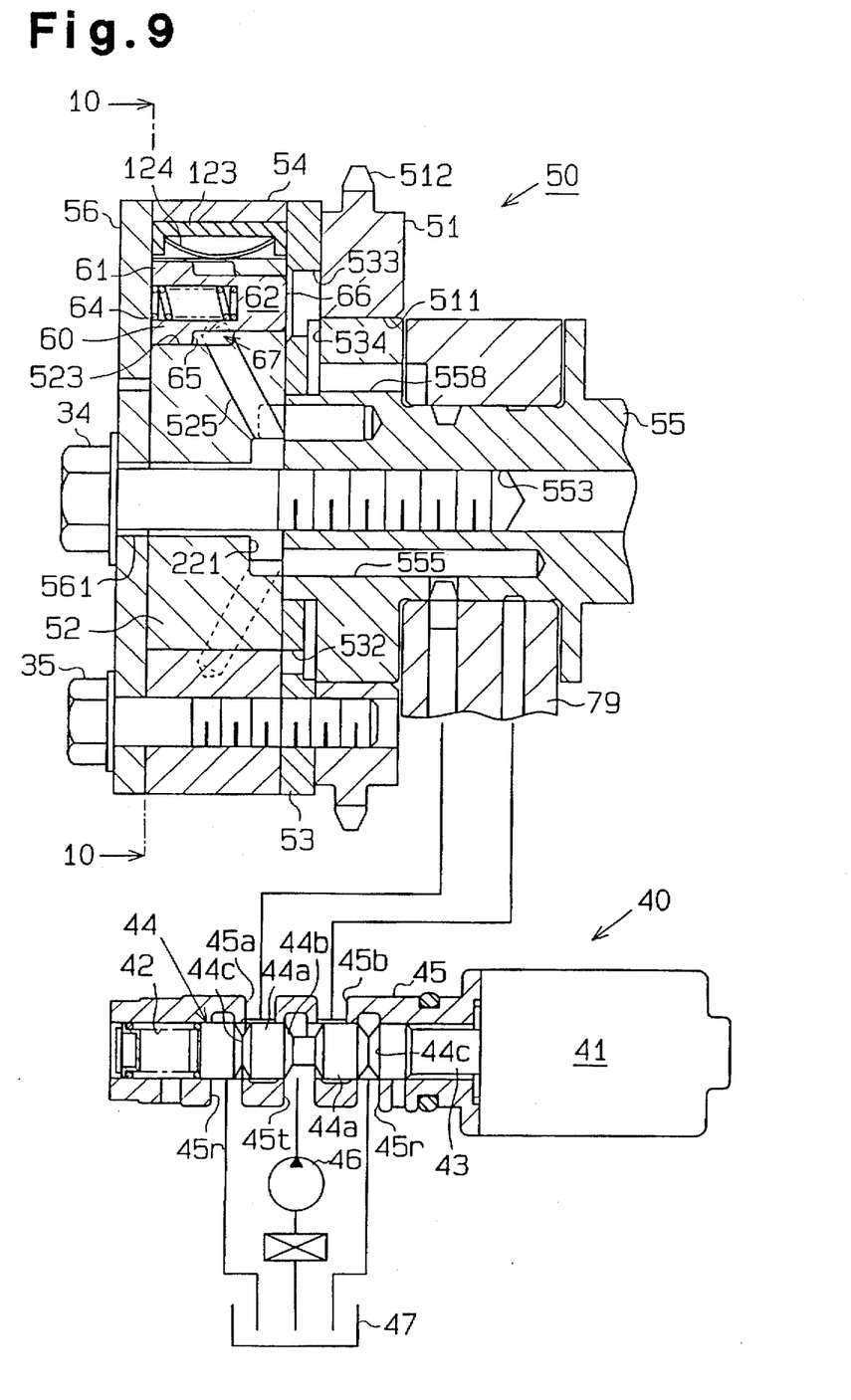
FIG. 9 shows a cross-sectional view of the VVT according to a fourth embodiment of the present invention taken along line 9—9 of FIG. 10.
Figure 10:
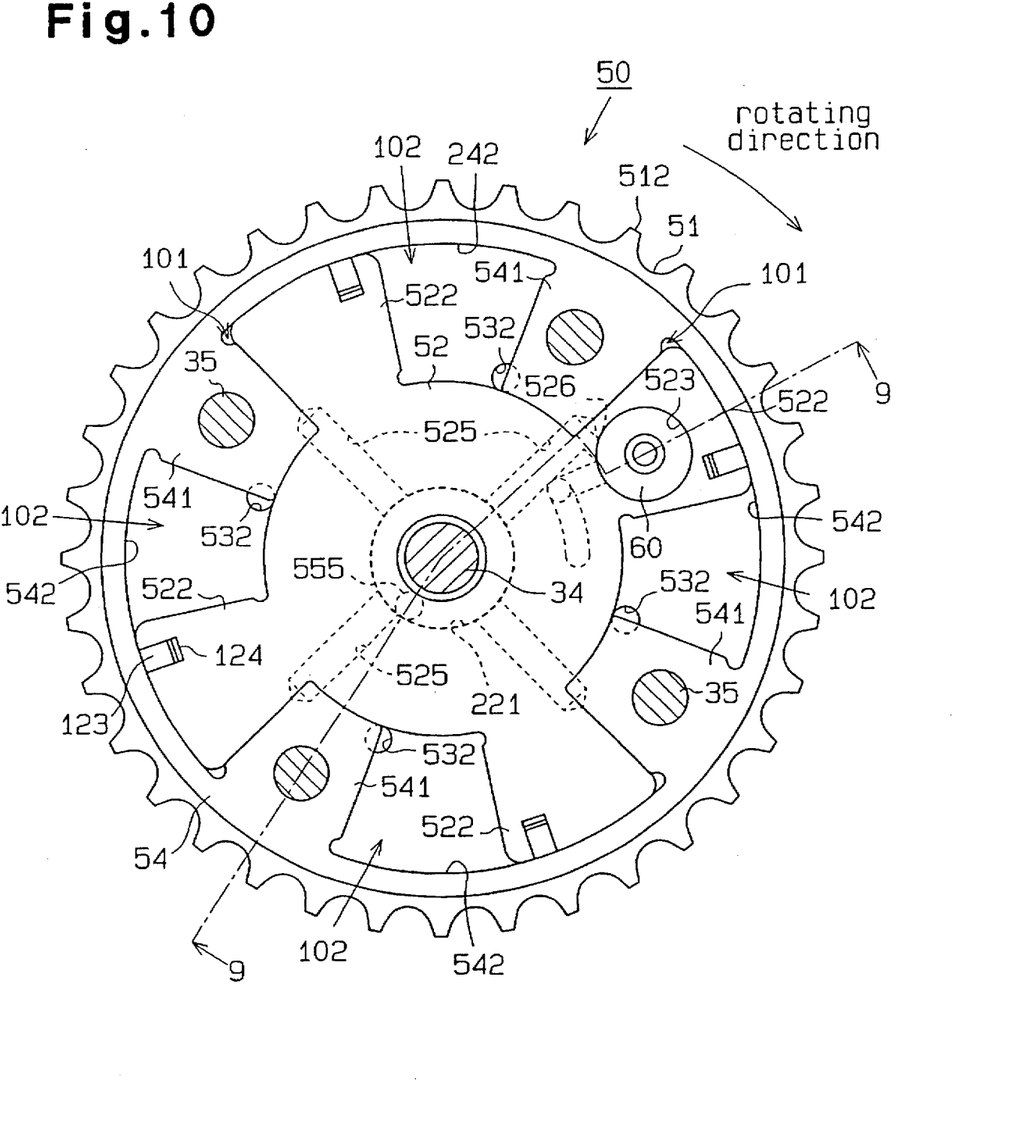
FIG. 10 shows a cross-sectional view taken along the line 10—10 of FIG. 9.

As shown in FIG. 9, the VVT 50 according to the fourth embodiment is provided with a lock pin 60 on one of four vanes 522. The lock pin 60 locks a rotor 52 relative to a sprocket 51 so as to retain the rotor 52 at the initial position of FIG. 10.

Four diagonal passages 525 are defined in the rotor 52 to connect the annular chamber 221 to each of the first hydraulic chambers 101. One passage 525 opens to the first hydraulic chamber 101 and also to a releasing chamber 67 (to be described later).

As shown in FIG. 9, the lock pin 60 is housed in a lock pin hole 523. The lock pin 60 has a cylindrical shape and has a large diameter portion 61 and a small diameter portion 62. The lock pin 60 is urged by a spring 64, which urges the lock pin 60 toward a plate 53. The lock pin 60 has a first pressure receiving face 65, between the large diameter portion 61 and the small diameter portion 62, and a second pressure receiving face 66, which is at the end of the small diameter portion 62. The first pressure receiving surface 65 receives pressure from the oil supplied to the first hydraulic chambers 101, whereas the second pressure receiving surface 66 receives pressure from the oil supplied to the second hydraulic chambers 102.

In the lock pin hole 523, the lock pin 60 defines an annular releasing chamber 67, and the first pressure receiving surface 65 is opposed to the releasing chamber 67. Oil pressure is supplied through the passage 525 to the releasing chamber 67.

The plate 53 contains a circular engaging hole 533 with which the lock pin 60 can engage. The second pressure receiving surface 66 of the lock pin 60 is opposed to the engaging hole 533.

An annular chamber 534 is defined between the right side of the plate 53 and the left end of a camshaft 55. The annular chamber 534 communicates with each of second hydraulic chambers 102 via oil holes 532 and also with the engaging hole 533. An oil passage 558, communicating with the annular chamber 543, is defined in the camshaft 55, and this oil passage 558 is connected to the OCV 40 via another oil passage (not shown) defined in the camshaft 55.

When the engine 28 (FIG. 6) is stopped, no oil pressure is supplied to the hydraulic chambers 101, 102, since the oil is drained into the oil pan 47. In this state, the lock pin 60 is urged toward the plate 53 by the force of the spring 64 and is maintained in engagement with the engaging hole 533. Accordingly, when the engine is stopped, rotation of the rotor 52 relative to the sprocket 51 is restricted.

When the engine is started, the rotor 52 is rotated integrally with the sprocket 51. Oil is gradually supplied to the hydraulic chambers 101, 102, and the oil pressure in the hydraulic chambers 101, 102 is unstable until they are filled. Meanwhile, the rotor 52 is subject to fluctuation in the torque of the camshaft 55. However, in the forth embodiment, since the movement of the rotor 52 is restricted by the lock pin 60, backlash of the rotor 52 is inhibited.

When the relative rotation of the rotor 52 is restricted as described above, a great load is applied to the inner surface of the plate 53, which has the engaging hole 533 defined formed therein. In this VVT 50, the inner surface of the plate 53 is surface hardened. As the material of the plate 53, boron steel subjected to induction hardening, Cr steel or Cr—Mn steel subjected to hardening and tempering treatment and carburizing treatment may be suitably employed.

Oil is supplied to the releasing chamber 67 or the engagement hole 533, although the pressure thereof is low when the engine is initially started. Accordingly, the lock pin 60 receives the pressure from oil at the first pressure receiving surface 65 or the second pressure receiving surface 66, and when the oil pressure is high enough, the lock pin 60 is disengaged from the engaging hole 533 against the urging force of the spring 64. Thus, after the oil pressure reaches a certain level, the engagement of the lock pin 60 with the engaging hole 533 is released to permit the rotor 52 to rotate relative to the sprocket 51. Once a sufficient oil pressure is reached, the lock pin 60 is maintained in the disengaged state until the engine is stopped.

The rotor 52 and the camshaft 55 are rotated relative to the sprocket 51 by supplying oil to either the first hydraulic chambers 101 or the second hydraulic chambers 102 (with the pin 60 retracted), and thus the valve timing of the valves 77 (FIG. 6) driven by the camshaft 55 can be changed.

When the engine is stopped, the supply of oil from the hydraulic pump 46 is stopped. When the engine is stopped, the spool 44 of the OVC 40 is stopped at the position where oil is supplied to the second hydraulic chambers 102, and the oil in each first hydraulic chamber 101 is discharged into the oil pan 47. Thus, the rotor 52 rotates to the initial position shown in FIG. 10. In this process, the oil pressure in the releasing chamber 67 and the engaging hole 533 is lowered, so that the lock pin 60 is engaged again with the engaging hole 533 to restrict relative rotation of the rotor 52.

As described above, since the VVT 50 is provided with a surface-hardened plate 53, damage to the plate 53 is prevented even if the lock pin 60 are frequently brought into contact with the inner surface of the plate 53.

In the fourth embodiment, once by the lock pin 60 is released, oil pressure is constantly supplied to either the releasing chamber 67 or the engaging hole 533, and the lock pin 60 is entirely retracted into the lock pin hole 532. Therefor, the lock pin 60 does not contact the plate 53 when the oil pressure is at normal operating levels.

According to the fourth embodiment, the sprocket 51, the housing 54 and the plate 53 are fixed by a bolt 34. However, it is possible to form the plate 53 using a sintered material and to join the sprocket 51, the plate 53 and the housing 54 with a brazing filler alloy when the plate 53 is sintered, thus improving seal between the housing 54 and the plate 53.

Although only several embodiments of the present invention have been described herein, it should be apparent to those skilled in the art that the present invention may be embodied in many other specific forms without departing from the spirit or scope of the invention. Particularly, it should be understood that the invention may be embodied in the following forms.

Figure 11:
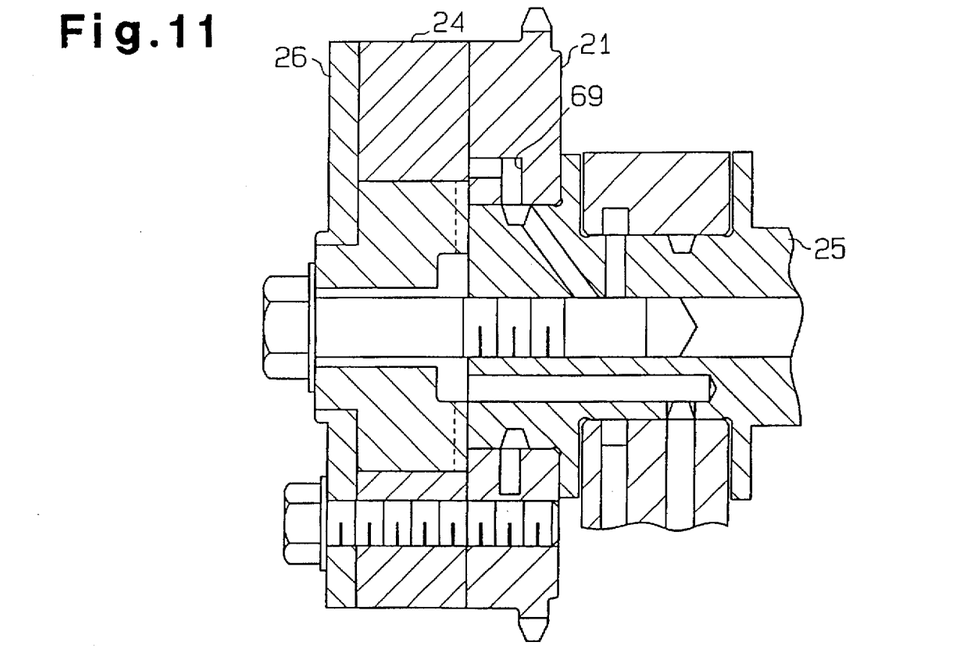
FIG. 11 shows a cross-sectional view of the VVT according to a fifth embodiment of the present invention.

As shown in FIG. 11, the plates 23 and 53 in the third embodiment and the fourth embodiment may be omitted. In this case, if the thickness of the sprocket 21 is increased, an annular chamber 69 can be formed as shown.

In the foregoing embodiments, while the valve timing of the intake valves 77 is changed, it is also possible to change the valve timing of the exhaust valves by attaching the VVT to the exhaust side camshaft.

In the foregoing embodiments, while the rotational phase of the intake side camshaft provided with the VVT is changed with respect to the crankshaft, it is also possible to change the rotational phase of the camshaft that is nor attached to the VVT. For example, in FIG. 1, the pulley 71 can be connected to the right end of the intake camshaft 14, and the pulley 71 can be connected to the pulley 76 of the crankshaft 73 by the belt 72. With this construction, the intake camshaft 14 is rotated synchronously with the crankshaft 73. Under operation of the VVT 10, the rotational phase of the exhaust side camshaft can be changed 70 relative to the crankshaft 73.

Therefore, the present examples and embodiments are to be considered as illustrative and not restrictive and the invention is not to be limited to the details given herein, but may be modified within the scope and equivalence of the appended claims.

What is claimed is:

1. An apparatus for adjusting valve timing of a valve of an engine, the valve being actuated by a cam, the apparatus comprising:

a camshaft for driving the cam, the camshaft having a circumferential surface and a first end, wherein the first end has an end face;

a first rotor fixed to the end face of the camshaft, the first rotor having radially extending vanes;

a second rotor arranged to surround the first rotor and to be rotatable relative to the first rotor, the second rotor having a recess formed therein, the recess being divided by the vane into a first pressure chamber and a second pressure chamber;

a first passage defined in the camshaft, for supplying hydraulic fluid to the first pressure chamber to change the rotational phase of the second rotor with respect to the camshaft, the first passage having an upstream end and a downstream end with respect to the direction of fluid flow during filling of the first hydraulic chamber, the first passage having a downstream opening in the end face; and a second passage defined in the camshaft for supplying hydraulic fluid to the second pressure chamber to change the rotational phase of the second rotor with respect to the camshaft, the second passage having an upstream end and a downstream end with respect to the direction of fluid flow during filling of the second hydraulic chamber, the second passage having a downstream opening in a surface of the camshaft other than the end face.

2. The apparatus according to claim 1, wherein said downstream end of the first passage extends primarily in the axial direction of the camshaft, and said downstream end of the second passage extends primarily in the radial direction of the camshaft.

3. The apparatus according to claim 2, the camshaft has an outer bearing surface, while a driven gear has an inner bearing surface that contacts the outer bearing surface of the camshaft, and the downstream opening of the second passage is in the outer bearing surface of the camshaft.

4. The apparatus according to claim 3, wherein the first rotor has a cylindrical boss, the outside diameter of which is smaller than the outside diameter of the end face.

5. The apparatus according to claim 4, wherein the first rotor has a third passage for connecting the first passage and the first pressure chamber, and the second rotor has a fourth passage for connecting the second passage and the second pressure chamber.

6. The apparatus according to claim 5, wherein the engine has a crankshaft, the apparatus further comprising a transmitting means for transmitting engine power from the crankshaft to the second rotor, and wherein the second rotor is rotated in fixed synchronism with the crankshaft.

7. The apparatus according to claim 1, wherein the first end of the camshaft has a flange face that is axially spaced from the end face, and the downstream opening of the second passage is formed in the flange face.

8. The apparatus according to claim 4, wherein the second rotor is surrounded by a housing.

9. The apparatus according to claim 8, wherein one of the vanes has locking means for restricting relative rotation between the first and second rotors.

10. The apparatus according to claim 9, wherein the locking means includes a lock pin and a recess with which the lock pin is selectively engaged.

11. The apparatus according to claim 5, wherein the opening of the third passage in the first pressure chamber is spaced far from the axis of the camshaft compared with the opening of the fourth passage of the second pressure chamber.

12. The apparatus according to claim 5, further comprising a hydraulic control unit for controlling the flow of fluid supplied to the first and second pressure chambers, a first conduit for connecting the first passage to the control unit and a second conduit for connecting the second passage to the control unit.

13. The apparatus according to claim 6, wherein the valve is an intake valve, and wherein the cam is fixed to the camshaft.

14. The apparatus according to claim 6, wherein the transmitting means includes a second camshaft, and one end of the second camshaft is connected to the crankshaft, while the other end of the second camshaft is connected to the second rotor.

15. The apparatus according to claim 7, wherein the engine has a crankshaft, the apparatus further comprising a transmitting means for transmitting engine power to the second rotor, and wherein the second rotor is rotated in fixed synchronism with the crankshaft.

16. An apparatus for adjusting the valve timing of an engine valve with respect to a crankshaft, the valve being actuated by a cam, the apparatus comprising:

a rotatable shaft, the rotatable shaft having a circumferential surface and a first end, wherein the first end has an end face;

a first rotor rotatably mounted to the first end such that the first rotor is coaxial to the rotatable shaft;

a second rotor mounted coaxially to the first end of the rotatable shaft such that the second rotor is rotatable relative to the first rotor, wherein one of the first and second rotors is fixed in locked synchronism with the crankshaft and the other is fixed to rotate in locked synchronism with the cam such that relative rotation between the two rotors changes the timing of the valve with respect to the crankshaft;

hydraulic actuation means for causing relative movement between the rotors, wherein a vane is formed on one of the rotors, and a recess is formed in the other of the rotors, such that the vane divides the recess into first and second hydraulic chambers;

a first passage formed in the rotatable shaft for supplying hydraulic fluid to the first hydraulic chamber for rotating the first rotor in a first direction with respect to the second rotor, the first passage having an upstream end and a downstream end with respect to the direction of fluid flow during filling of the first hydraulic chamber, wherein the first passage has a downstream opening in the end face;

a second passage formed in the rotatable shaft for supplying hydraulic fluid to the second hydraulic chamber for rotating the first rotor in a second direction with respect to the second rotor, the second passage having an upstream end and a downstream end with respect to the direction of fluid flow during filling of the second hydraulic chamber, wherein the second passage has downstream opening in a surface of the rotatable shaft other than the end face, and wherein the downstream opening of the second passage is radially further from the axis of the rotatable shaft than the downstream opening of the first passage.

17. The apparatus according to claim 16, wherein locking means are provided for locking the first rotor to the second rotor when the engine is not running, wherein the locking means includes a locking member connected to one of the rotors, wherein the locking member is spring biased into a locking position when the engine is not running, and a locking member receiver operationally connecting to the other of the rotors, wherein the locking member engages the locking member receiver to lock the rotors together, and wherein the hydraulic fluid urges the locking member to an unlocked position when the engine reaches a predetermined running condition.

18. The apparatus according to claim 16 further comprising a hydraulic control unit for controlling the flow of fluid to the first and second passages, a first conduit for connecting the hydraulic control unit to the first passage, and a second conduit for connecting the hydraulic control unit to the second passage.

19. The apparatus according to claim 16, wherein a downstream portion of the first passage extends generally in an axial direction of the rotatable shaft, and wherein a downstream portion of the second passage extends generally in a radial direction of the rotatable shaft.

20. The apparatus according to claim 16, wherein the first end of the shaft has a flange face that is axially spaced from the end face, and the downstream opening of the second passage is formed in the flange face.

* * * * *

UNITED STATES PATENT AND TRADEMARK OFFICE
CERTIFICATE OF CORRECTION

Page 1 of 2

PATENT NO. : 5,724,929
DATED : 10 March 1998
INVENTOR(S) : Kazuhisa Mikame et al.

It is certified that error appears in the above-identified patent and that said Letters Patent is hereby corrected as shown below:

On the title page, item [57], Line 17: Before "outer" insert --the--.

| Column | Line | |
|---|---|---|
| 1 | 21 | After "discloses" delete "this". |
| 2 | 26 | Before "apparatus" insert --the--. |
| 2 | 53 | Change "principals" to --principles--. |
| 4 | 57 | Change "connects" to --connect--. |
| 5 | 28 | Before "cylindrical" insert --a--. |
| 5 | 61 | Change "state. When" to --state when--. |
| 5 | 62 | After "112" insert --abutts--. |
| 6 | 21 | Change "illustrated" to --illustration--. |
| 6 | 50 | Change "lest" to --left--. |

UNITED STATES PATENT AND TRADEMARK OFFICE
CERTIFICATE OF CORRECTION

PATENT NO. : 5,724,929
DATED : 10 March 1998
INVENTOR(S) : Kazuhisa Mikame et al.

It is certified that error appears in the above-identified patent and that said Letters Patent is hereby corrected as shown below:

| Column | Line | |
|---|---|---|
| 7 | 56 | After "with" delete "to". |
| 9 | 33 | After "533" delete "defined". |
| 10 | 1 | Change "are" to --is--. |
| 10 | 31 | Change "nor" to --not--. |
| 10 | 38 | After "camshaft" insert --70--; after "changed" delete "70". |
| 11 | 12 | After "claim 2," insert --wherein-- |
| 12 | 33 | After "has" insert --a--. |

Signed and Sealed this

Twenty-second Day of December, 1998

Attest:

BRUCE LEHMAN

Attesting Officer    Commissioner of Patents and Trademarks